US008219504B1

(12) United States Patent
Weiss et al.

(10) Patent No.: US 8,219,504 B1
(45) Date of Patent: Jul. 10, 2012

(54) METHOD AND SYSTEM FOR ESTIMATING THE ACTUAL COST OF A PRODUCT OR SERVICE USING FINANCIAL DATA

(75) Inventors: Benjamin Weiss, Portola Valley, CA (US); Todd M. Fitch, Santa Clara, CA (US); Glynis Hively, Santa Clara, CA (US)

(73) Assignee: Intuit Inc., Mountain View, CA (US)

( * ) Notice: Subject to any disclaimer, the term of this patent is extended or adjusted under 35 U.S.C. 154(b) by 998 days.

(21) Appl. No.: 12/020,457

(22) Filed: Jan. 25, 2008

(51) Int. Cl.
*G06Q 99/00* (2006.01)
(52) U.S. Cl. ....... 705/400; 705/26.1; 705/7.32; 705/319
(58) Field of Classification Search ................ 705/26.1, 705/27, 319, 400, 7.32
See application file for complete search history.

(56) References Cited

U.S. PATENT DOCUMENTS

| | | | | |
|---|---|---|---|---|
| 7,406,436 | B1* | 7/2008 | Reisman | 705/7.32 |
| 7,702,545 | B1* | 4/2010 | Compton et al. | 705/26.9 |
| 7,778,890 | B1* | 8/2010 | Bezos et al. | 705/26.1 |
| 2004/0039604 | A1* | 2/2004 | Tallal, Jr. | 705/2 |
| 2005/0159962 | A1* | 7/2005 | Weiss et al. | 705/1 |
| 2008/0082349 | A1* | 4/2008 | Zackrison et al. | 705/1 |
| 2008/0255967 | A1 | 10/2008 | Shi | |
| 2010/0191619 | A1* | 7/2010 | Dicker et al. | 705/27 |

OTHER PUBLICATIONS

"Expense Tracking: The True Cost of an iPhone, a Car, and Other Things You Don't Know About", Jul. 20, 2007, Mint.com, 6 pages.*
Weiss et al., "Method and System for Determining the Actual Cost of a Product or Service Using Financial Data", U.S. Appl. No. 12/104,081, filed Apr. 16, 2008.

* cited by examiner

*Primary Examiner* — John Hayes
*Assistant Examiner* — Freda A Nelson
(74) *Attorney, Agent, or Firm* — McKay and Hodgson, LLP; Philip Mckay; Sean P. Lewis

(57) ABSTRACT

Financial data associated with one or more "contributing consumers" is obtained from one or more sources. The financial data includes data associated with specific financial transactions and the specific financial transactions are tagged as sharable by the contributing consumers. The financial data, and/or specific financial transactions are categorized by the contributing consumers, and/or associated with a specific purchase of a parent product and/or service. The financial data obtained from one or more contributing consumers is then aggregated, processed, and/or categorized, according to the parent product and/or service associated with the financial data. A "user consumer" then initiates a request for financial data associated with the purchase of a specified product and/or service. The financial data obtained from one or more contributing consumers is then searched and data associated with the purchase of the specified product and/or service and any other secondary purchases, is presented to the user consumer.

33 Claims, 5 Drawing Sheets

300

New Tag

New Tag

*Required fields

Name* | Mexico Trip  301
Description | Mexico Fall 2007  303
Copy number | ☐ Tell me more ☑ Share this spending info with others.
  Tell me more.
307                                    305

? | OK | Cancel

FIG. 3

Select Items for Savings Target

Select Items: Tagged "Mexico" 501

Select items or activities that pertain to your savings target.

Show me:  ● Average values
          ○ Low values          503
          ○ High values

505

| Item | Description | Unit | Average Amt. |
|---|---|---|---|
| ☑ Parasailing | 📄 | Each | $100.00 |
| ☐ Jungle Jeep Tour | 📄 | Each | $75.00 |
| ☐ Taxi | 📄 | Per Mile | $.75 |
| ☑ Ixtapa tour | 📄 | Each | $80.00 |
| ☐ Ixtapa Admission | 📄 | Each | $75.00 |
| ☐ Mystic Snorkeling Tour | 📄 | Each | $100.00 |
| ☑ Item 6 | 📄 | Each | $100.00 |
| ☑ Item 7 | 📄 | Each | $100.00 |
| ☐ Item 8 | 📄 | Each | $100.00 |
| ☐ Item 9 | 📄 | Each | $100.00 |
| ☐ Item 10 | 📄 | Each | $100.00 |
| ☑ Item 11 | 📄 | Each | $100.00 |
| ✓ Total | | | $480.00 |

[ OK ]  [ Cancel ]

FIG. 5

METHOD AND SYSTEM FOR ESTIMATING THE ACTUAL COST OF A PRODUCT OR SERVICE USING FINANCIAL DATA

BACKGROUND

It is often very important for consumers to determine the total cost associated with the purchase of a product and/or service as accurately as possible. This is true for both budgeting purposes, such as when saving for a given product and/or service, or to determine if a given product and/or service can be immediately purchased with existing funds. However, for many products and services, determining the actual likely total cost of a product and/or service is quite difficult.

For instance, a readily recognizable multi-component purchase, such as a vacation, wedding, or a home remodel, often has hidden costs that are not anticipated, or budgeted for, by the consumer.

As a specific example, when planning a vacation, a consumer can probably quite accurately determine the cost of travel, i.e., the cost of plane or boat tickets, or even gasoline. In addition the consumer can probably fairly accurately determine lodging costs, although many forget to budget for bell service, valet service, and other gratuities. In addition, a consumer can probably do a fair job of estimating food costs. However, here again, consumers often forget to budget for gratuities and other costs associated with dinning, such as drinks. However, absent prior experience, an average consumer may not consider, or even be aware of, other "hidden" costs associated with a vacation, particularly a vacation to another country and/or a vacation to a destination the consumer has never been to before. Some examples of hidden costs include, but are not limited to, in this specific example: the cost of any vaccinations and/or passport fees; bell person and other service related gratuities; parking; local transportation costs, such as taxi and bus fees; professional guide fees; costs associated with supplementary activities such as parasailing, scuba diving, boat rental, fishing tackle, bicycles, sight seeing tours, etc.; and/or any other unanticipated costs that a consumer may not be able to foresee, absent previous experience with the same vacation destination.

In addition to readily recognizable multi-component purchases, it is often the case that what appears to be single component purchase is, in reality, a multi-component purchase with one or more hidden costs. For example, purchase of HDTVs or computing systems may appear to be a single cost, i.e., the cost of the HDTV or computing system itself. However, the consumer often discovers, and often after the initial purchase of the product, that in order for the product to function optimally, or in some cases at all, other components must also be purchased.

As a specific example of a seemingly single component purchase that is, in reality, often a multi-component purchase, a consumer may budget for, and purchase, a big screen HDTV. However, when purchasing the HDTV, the consumer discovers that the HDTV requires a special stand or wall mounting system. In addition, the consumer may discover that in order to view HD signals, a special HDMI cable is required, but is not included with the HDTV. In addition, the consumer may discover that in order to receive HD programming, his or her cable company charges an additional premium fee. In addition, the consumer may also discover that his or her DVD player is not an HDDVD player and therefore does not provide the full "HDTV experience" for the consumer. Finally, the consumer may find that his or her DVDs are not HDDVDs and, as a result, part of his or her DVD collection must be re-purchased in the new HDDVD format in order to provide the consumer the full "HDTV experience". Consequently, a consumer budgeting for just the cost of the HDTV is likely to break his or her budget very quickly.

As a result of the situations described above, it is currently quite difficult to determine the actual total cost associated with many purchases of products and/or services. Consequently, many consumers are faced with unexpected costs associated with a given purchase, and many carefully prepared budgets are negated by these unexpected costs. This can cause significant consumer stress and all but nullify the consumer's joy and satisfaction with the purchase and/or the service and/or product itself.

SUMMARY

In accordance with one embodiment, a system and method for estimating the actual cost of a product and/or service includes a process for estimating the actual cost of a product and/or service whereby financial data associated with one or more "contributing consumers" is obtained from one or more sources. In one embodiment, the contributing consumers agree to share the financial data with other "user consumers". In one embodiment, the financial data includes data associated with specific financial transactions and, in one embodiment; the specific financial transactions are tagged as sharable by the contributing consumers. In one embodiment, the financial data is categorized by the contributing consumers and, in one embodiment multiple financial transactions are associated with a specific purchase of a parent product and/or service by the contributing consumers. In one embodiment, the financial data obtained from one or more contributing consumers is aggregated, processed, and/or categorized, according to the parent product and/or service purchased that is associated with the financial transaction data. In one embodiment, the aggregated and/or categorized financial data is then stored by the process for estimating the actual cost of a product and/or service. In one embodiment, a user consumer then initiates a request for cost data associated with the purchase of a specified parent product and/or service. In one embodiment, the aggregated and/or categorized financial data obtained from one or more contributing consumers is then searched and results data representing multiple financial transactions and/or purchases associated with the purchase of the specified parent product and/or service is obtained. In one embodiment, the results data obtained is then presented to the user consumer in any one of various data and/or report formats; in one embodiment indicating the actual cost associated with the purchase or the specific parent product and/or service, including other products and/or services purchased in association with the specific parent product and/or service.

In one embodiment, the financial data obtained from one or more contributing consumers is general financial data representing a given contributing consumer's general and/or overall financial status and/or demographics, including, but not limited to: the contributing consumer's total assets; the contributing consumer's total liabilities/debt; the contributing consumer's net worth; the contributing consumer's average discretionary spending; the contributing consumer's age group; various demographic data regarding the contributing consumer and/or the contributing consumer's spending; and/or any other data regarding the contributing consumer's general and/or overall financial status desired and/or available. In one embodiment, as discussed below, the contributing consumer's general and/or overall financial status and/or demographics data is used to categorize and/or identify contributing consumers according to various criteria so a user consumer can narrow search results to results from specific "types" of contributing consumers.

In one embodiment, the financial data for one or more contributing consumers includes data regarding specific financial transactions conducted by the contributing consumer including, but not limited to: dates of specific financial transactions; payees/payers associated with specific financial transactions; categories of specific financial transactions; total expenditures in specific financial transaction categories over designated time frames; specific items purchased through specific financial transactions; and/or any other data regarding specific financial transactions desired and/or available, and designated as sharable by the contributing consumer.

In one embodiment, the financial data for one or more contributing consumers is obtained from one or more computing system implemented financial management systems as defined herein, and/or as known in the art the time of filing, and/or as developed after the time of filing.

In one embodiment, the contributing consumers agree to share the financial data with user consumers on a transaction-by-transaction approval basis. In one embodiment, the contributing consumers agree to share the financial data with user consumers on a transaction category approval basis. In one embodiment, the contributing consumers agree to share the financial data with user consumers without restriction. In other embodiments, the contributing consumers agree to share the financial data with user consumers based on any restrictions/criteria defined by the contributing consumer.

In one embodiment, the financial data to be shared is tagged as sharable by the contributing consumers using a user interface display and a user interface device, such as those defined herein, known in the art, or developed after the time of filing.

In one embodiment, specific financial transaction data is categorized by the contributing consumer and one or more specific financial transactions are associated by the contributing consumer with a specific parent event, such as a specific vacation. In one embodiment, the specific financial transaction data is categorized by the contributing consumer and one or more financial transactions are associated by the contributing consumer with a specific purchase of a parent product and/or service, such as an HDTV purchase.

In one embodiment, a given financial transaction category including two or more specific financial transactions is associated by the contributing consumer with a specific event, such as a specific vacation. In one embodiment, a given financial transaction category including two or more specific financial transactions is associated by the contributing consumer with a specific purchase of a product and/or service, such as an HDTV purchase.

In one embodiment, all financial transactions in a given time period are associated by the contributing consumer with a specific event, such as a specific vacation. In one embodiment, all financial transactions in a given time period are associated by the contributing consumer with a specific purchase of a product and/or service, such as an HDTV purchase.

In one embodiment, all financial transactions having a given payee are associated by the contributing consumer with a specific event, such as a specific vacation. In one embodiment, all financial transactions having given payee are associated by the contributing consumer with a specific purchase of a product and/or service, such as an HDTV purchase.

In one embodiment, the financial data obtained from one or more contributing consumers is aggregated according to the parent product and/or service purchased that the financial data is associated with, and/or the categorizations provided by the contributing consumers.

In one embodiment, the financial data obtained from one or more contributing consumers is aggregated according to the parent product and/or service purchased that the financial data is associated with, and/or categorizations and/or re-categorizations, and/or groupings determined by the process for estimating the actual cost of a product and/or service.

In one embodiment the contributing consumer financial data is then stored by, or under the control of, the process for estimating the actual cost of a product and/or service in a database, as defined herein, known in the art at the time of filing, or as developed after the time of filing.

In one embodiment, a user consumer initiates a request for cost data associated with the purchase of a specified product and/or service using a user interface display and a user interface device. In one embodiment, the user consumer provides other search parameters and/or criteria, such as a request to see all results from specific categories of contributing consumers or from contributing consumers having specific financial and/or demographic attributes.

In one embodiment, the financial data obtained from one or more contributing consumers is then searched and search results data associated with the purchase of the user consumer specified product and/or service, and/or most closely matching any user consumer search parameters and/or criteria, is gathered. In one embodiment, the search results data includes data representing all financial transactions, and therefore all purchases, associated with the purchase of the purchase of the user consumer specified product and/or service, i.e., the parent product and/or service.

In one embodiment, the search results data associated with the purchase of the user consumer specified product and/or service, and/or most closely matching any user consumer search parameters and/or criteria, is then presented to the user consumer in any one of various data and/or report formats; in one embodiment showing the actual cost associated with the purchase of the specific product and/or service, and/or all a listing of all other products and/or services purchased in association with the specific parent product and/or service by the one or more contributing consumers.

Using the system and method for estimating the actual cost of a product and/or service disclosed herein, a potential consumer of a given product and/or service is provided the opportunity to see the financial data associated with other consumer's purchases of the given product and/or service and, in particular, what other purchases/costs were associated with the purchase of the given product and/or service. Consequently, using the system and method for estimating the actual cost of a product and/or service disclosed herein, a potential consumer of a given product and/or service can learn from the experience of other consumers of the given product and/or service and thereby more readily determine the actual cost associated with the purchase of a given product and/or service. Therefore, using the system and method for estimating the actual cost of a product and/or service disclosed herein, the potential consumer is far less likely to be faced with unexpected costs associated with a given purchase.

BRIEF DESCRIPTION OF THE DRAWINGS

FIG. 3 is a contributing consumer interface display for tagging a given financial transaction as sharable financial data and associating a given financial transaction with the purchase of a given product and/or service, as would be displayed on a display device, in one specific example, in accordance with one embodiment;

FIG. 5 is a search results display as would be displayed on a display device in one specific example in accordance with one embodiment.

Figure 1:
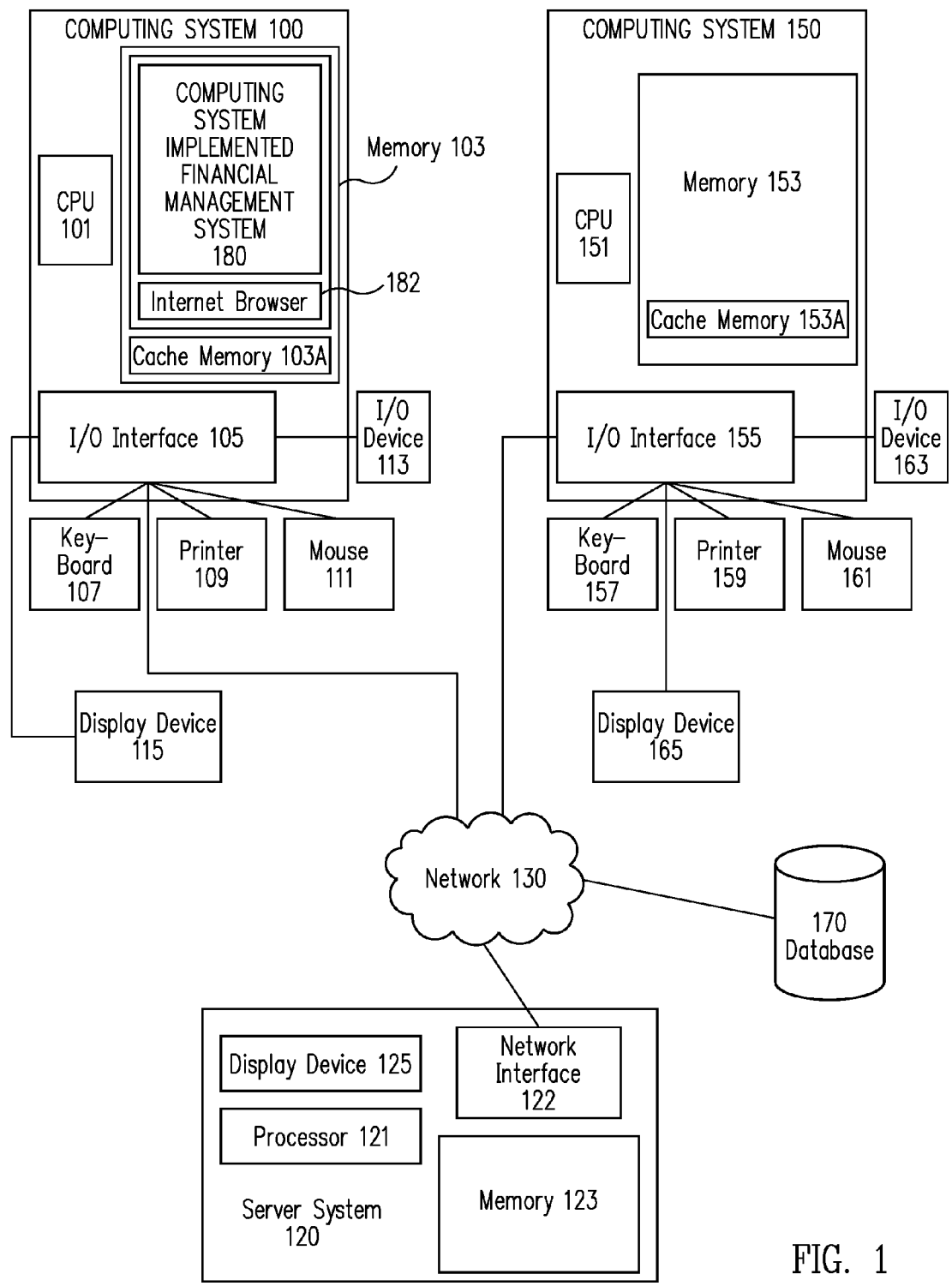
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a system and method for estimating the actual cost of a product and/or service includes a process for estimating the actual cost of a product and/or service whereby financial data associated with one or more "contributing consumers" is obtained from one or more sources. In one embodiment, the contributing consumers agree to share the financial data with other "user consumers". In one embodiment, the financial data includes data associated with specific financial transactions and, in one embodiment; the specific financial transactions are tagged as sharable by the contributing consumers. In one embodiment, the financial data is categorized by the contributing consumers and, in one embodiment multiple financial transactions are associated with a specific purchase of a parent product and/or service by the contributing consumers. In one embodiment, the financial data obtained from one or more contributing consumers is aggregated, processed, and/or categorized, according to the parent product and/or service purchased that is associated with the financial transaction data. In one embodiment, the aggregated and/or categorized financial data is then stored by the process for estimating the actual cost of a product and/or service. In one embodiment, a user consumer then initiates a request for cost data associated with the purchase of a specified parent product and/or service. In one embodiment, the aggregated and/or categorized financial data obtained from one or more contributing consumers is then searched and results data representing multiple financial transactions and/or purchases associated with the purchase of the specified parent product and/or service is obtained. In one embodiment, the results data obtained is then presented to the user consumer in any one of various data and/or report formats; in one embodiment indicating the actual cost associated with the purchase or the specific parent product and/or service, including other products and/or services purchased in association with the specific parent product and/or service.

Hardware System Architecture

FIG. 1 is a block diagram of an exemplary hardware architecture for implementing one embodiment of a system and method for estimating the actual cost of a product and/or service, such as exemplary process 200 (FIG. 2) discussed herein, that, returning to FIG. 1, includes: a computing system 100, e.g., a first computing system; a computing system 150, e.g., a second computing system; a server system 120; and a database 170, all operatively coupled by a network 130.

As seen in FIG. 1, computing system 100 typically includes a central processing unit (CPU) 101, an input/output (I/O) interface 105, and a memory system 103, including cache memory 103A. In one embodiment, memory system 103 includes all, or part of, a computing system implemented financial management system 180 such as any computing system implemented financial management system defined herein, known in the art at the time of filing and/or as developed thereafter. In one embodiment, computing system implemented financial management system 180 is stored, in whole, or in part, in memory system 103, and is used by, or includes, or is accessed by, as discussed below, a process for estimating the actual cost of a product and/or service, such as exemplary process 200 (FIG. 2) discussed below.

Returning to FIG. 1, computing system 100 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, computing system 100, whether available or known at the time of filing or as later developed. As discussed in more detail below, in one embodiment, a process for estimating the actual cost of a product and/or service and/or a computing system implemented financial management system are entered, in whole, or in part, into computing system 100 via I/O device 113, such as from a CD, DVD, floppy disk, portable hard drive, memory stick, download site, or other medium and/or computer program product as defined herein.

In one embodiment, computing system 100 also includes an Internet browser capability 182 that, in one embodiment, includes a search engine (not shown) and is stored, in whole, or in part in memory 103.

In one embodiment, computing system 100 is a computing system accessible by one or more contributing consumer and used and/or accessible by another computing system, such as computing system 150 (discussed below). Computing systems 100 and 150 can be any computing system as defined herein and/or as known in the art at the time of filing and/or as developed thereafter, that includes components that can execute all, or part, of a process for estimating the actual cost of a product and/or service, and/or a computing system implemented financial management system, in accordance with at least one of the embodiments as described herein.

In one embodiment, computing system 100 is used, controlled, and/or accessible by, a provider of and/or a system and process for estimating the actual cost of a product and/or service and data representing all, or part, of financial data associated with one or more contributing consumers is stored in computing system 100, typically in accounts associated with a given contributing consumer. In one embodiment, computing system 100 is used, controlled, and/or accessible by, a provider of and/or a computing system implemented financial management system and data representing all, or part, of financial data associated with one or more contributing consumers is stored in computing system 100, typically in accounts associated with a given contributing consumer.

Similarly, computing system 150 typically includes a CPU 151, an input/output (I/O) interface 155, and a memory system 153, including cache memory 153A. Similar to computing system 100, computing system 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing system 150, whether available or known at the time of filing or as later developed.

In one embodiment, computing system 150 is used, controlled, and/or accessible by one or more user consumers and used and/or accessible by another computing system, such as computing system 100. In one embodiment, computing system 150 is used, controlled, and/or accessible by, a provider of and/or a system and process for estimating the actual cost of a product and/or service and data representing all, or part, of data associated with one or more user and/or contributing consumers is stored in computing system 150, typically in accounts associated with a given consumer. In one embodiment, computing system 150 is used, controlled, and/or accessible by, a provider of and/or a computing system implemented financial management system and data representing all, or part, of financial data associated with one or more user and/or contributing consumers is stored in computing system 150, typically in accounts associated with a given consumer.

As discussed in more detail below, in one embodiment, all, or part of, a process for estimating the actual cost of a product and/or service, and/or a computing system implemented financial management system, can also be loaded, in whole, or in part, into computing system 150 from computing system 100 for storage in memory system 153 and/or cache memory 153A.

Also shown in FIG. 1 is database 170. In one embodiment, database 170 is a data storage device, a designated server system or computing system, or a designated portion of one or more server systems or computing systems, such as computing systems 100, 150 and server system 120, or a distributed database, or an external and/or portable hard drive. In one embodiment, database 170 is a dedicated mass storage device implemented in software, hardware, or a combination of hardware and software. In one embodiment, database 170 includes a web-based function. As discussed in more detail below, in one embodiment, database 170 is under the control of a contributing consumer, and/or the contributing consumer's agents, a user consumer, and/or the user consumer's agents, and/or a process for estimating the actual cost of a product and/or service, and/or a computing system implemented financial management system.

In one embodiment, database 170 is used, controlled, and/or accessible by, a provider of and/or a system and process for estimating the actual cost of a product and/or service and data representing all, or part, of financial data associated with one or more contributing consumers is stored in database 170 (FIG. 1). In one embodiment, database 170 is used, controlled, and/or accessible by, a provider of and/or a computing system implemented financial management system and data representing all, or part, of financial data associated with one or more contributing consumers is stored in database 170.

In one embodiment, computing systems 100 and 150, and database 170, are coupled to a server system 120 through network 130. In one embodiment, server system 120 typically includes a server system display device 125, a server system processor 121, a server system memory 123, and a server system network interface 122.

In one embodiment, server system 120 is used in a station-to-station arrangement, such as a peer-to-peer, or hybrid peer-to peer, arrangement, as an indexing and/or central server used to connect a first computing system, such as computing system 100, and a second computing system, such as computing system 150.

In one embodiment, server system 120 is used, controlled, and/or accessible by, a provider of and/or a system and process for estimating the actual cost of a product and/or service and data representing all, or part, of financial data associated with one or more contributing consumers is stored in server system 120. In one embodiment, server system 120 is used, controlled, and/or accessible by, a provider of and/or a computing system implemented financial management system and data representing all, or part, of financial data associated with one or more contributing consumers is stored in server system 120.

Network 130 can be any network or network system as defined herein, known in the art at the time of filing, and/or as developed after the time of filing, capable of allowing communication between two or more computing systems, whether available or known at the time of filing or as later developed.

Those of skill in the art will readily recognize that the components shown in FIG. 1, such as computing systems 100 and 150, database 170, server system 120, and their respective components, are shown for illustrative purposes only and that architectures with more or fewer components can implement, and benefit from, the invention. Moreover, one or more components of computing system 100, computing system 150, database 170, and server system 120 may be located remotely from their respective system and accessed via network 130, as discussed herein. In addition, the particular type of, and configuration of, computing systems 100 and 150, database 170, and server system 120 are not relevant.

As discussed in more detail below, in one embodiment, a process for estimating the actual cost of a product and/or service and/or a computing system implemented financial management system, and/or financial data associated with one or more contributing consumers, are stored, in whole, or in part, in memory system 103 and/or cache memory 103A, of computing system 100, and/or memory system 153 and/or cache memory 153A of computing system 150, and/or in server memory system 123 of server system 120 and/or in database 170, and executed on computing system 100 and/or computing system 150. As used herein, a memory refers to a volatile memory, a non-volatile memory, or any combination of the two.

Although a process for estimating the actual cost of a product and/or service, and/or a computing system implemented financial management system, are sometimes referred to herein, alternatively, as a process, an application, a module, a program, a component of a software system, a component of a software package, a component of a parent system, a plug-in, or a feature of a parent system, this terminology is illustrative only. In some embodiments, a process for estimating the actual cost of a product and/or service and/or a computing system implemented financial management system are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101 and 151, or server system processor 121. In one embodiment, execution of a process by CPU 101, CPU 151, or server system processor 121, results in the operations of an agent computer process (not shown) and/or a rule computer process (not shown).

In one embodiment, a process for estimating the actual cost of a product and/or service, and/or a computing system implemented financial management system, and/or financial data associated with one or more contributing consumers, are computer applications or processes and/or data implemented and/or run and/or stored, in full, or in part, in, or on, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, in some embodiments, the medium also may be removable and/or remote from the computing system.

Process

Herein, the term "contributing consumer", denotes any party and/or entity for whom, or from whom, purchase information is obtained by a process for estimating the actual cost of a product and/or service, and/or a person and/or entity for whom, or from whom, purchase information is obtained by a process for estimating the actual cost of a product and/or service, and/or a legal guardian of person and/or entity for whom, or from whom, purchase information is obtained by a process for estimating the actual cost of a product and/or service, and/or an authorized agent of any party and/or person and/or entity for whom, or from whom, purchase information is obtained by a process for estimating the actual cost of a product and/or service.

Herein, the term "user consumer" and "user" are used interchangeably to denote any party and/or entity that interfaces with, and/or to whom information is provided by, a process for estimating the actual cost of a product and/or service, and/or a person and/or entity that interfaces with, and/or to whom information is provided by, a process for estimating the actual cost of a product and/or service, and/or a legal guardian of person and/or entity that interfaces with, and/or to whom information is provided by, a process for estimating the actual cost of a product and/or service, and/or an authorized agent of any party and/or person and/or entity that interfaces with, and/or to whom information is provided by, a process for estimating the actual cost of a product and/or service.

As used herein, the term "product" and "product and/or service" are used interchangeably to denote a product, a service, or both a product and a service, or multiple products and/or services that can be purchased and/or otherwise obtained by a contributing consumer and/or a user consumer.

As used herein, the term computing system, denotes, but is not limited to: a portable computer; a workstation; a two-way pager; a cellular telephone; a smart phone; a digital wireless telephone; a Personal Digital Assistant (PDA); an MP3 Player and/or other music and/or video player; a server computer; an Internet appliance; or any other device that include components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; MP3 Players and/or other music and/or video players; server computers; or any desired combination of these devices, that are coupled to perform the processes and/or operations as described herein.

As used herein, the term computing system implemented financial management system includes, but is not limited to: computing system implemented personal and small business financial management systems, packages, programs, modules, or applications; computing system implemented business systems, packages, programs, modules, or applications; computing system implemented tax preparation systems, packages, programs, modules, or applications; computing system implemented accounting and/or invoicing systems, packages, programs, modules, or applications; and various other electronic transaction driven data management systems, packages, programs, modules, or applications, whether known at the time of filling or as developed later.

As used herein, the term "network" is used to demote any network or network system that is of interest such as, a peer-to-peer network, a hybrid peer-to-peer network, a Local Area Network (LAN), a Wide Area Network (WAN), a public network, such as the Internet, a private network, a combination of different network types, or other wireless, wired, and/or a wireless and wired combination network capable of allowing communication between two or more computing systems, whether available or known at the time of filing or as later developed.

As used herein, the term "database" is used to define any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to a data storage means that is part of, or under the control of, any computing system, as defined, known at the time of filing, or as developed thereafter.

In accordance with one embodiment, a system and method for estimating the actual cost of a product and/or service includes a process for estimating the actual cost of a product and/or service whereby financial data associated with one or more "contributing consumers" is obtained from one or more sources. In one embodiment, the contributing consumers agree to share the financial data with other "user consumers". In one embodiment, the financial data includes data associated with specific financial transactions and, in one embodiment; the specific financial transactions are tagged as sharable by the contributing consumers. In one embodiment, the financial data is categorized by the contributing consumers and, in one embodiment multiple financial transactions are associated with a specific purchase of a parent product and/or service by the contributing consumers. In one embodiment, the financial data obtained from one or more contributing consumers is aggregated, processed, and/or categorized, according to the parent product and/or service purchased that is associated with the financial transaction data. In one embodiment, the aggregated and/or categorized financial data is then stored by the process for estimating the actual cost of a product and/or service. In one embodiment, a user consumer then initiates a request for cost data associated with the purchase of a specified parent product and/or service. In one embodiment, the aggregated and/or categorized financial data obtained from one or more contributing consumers is then searched and results data representing multiple financial transactions and/or purchases associated with the purchase of the specified parent product and/or service is obtained. In one embodiment, the results data obtained is then presented to the user consumer in any one of various data and/or report formats; in one embodiment indicating the actual cost associated with the purchase or the specific parent product and/or service, including other products and/or services purchased in association with the specific parent product and/or service.

Figure 2:
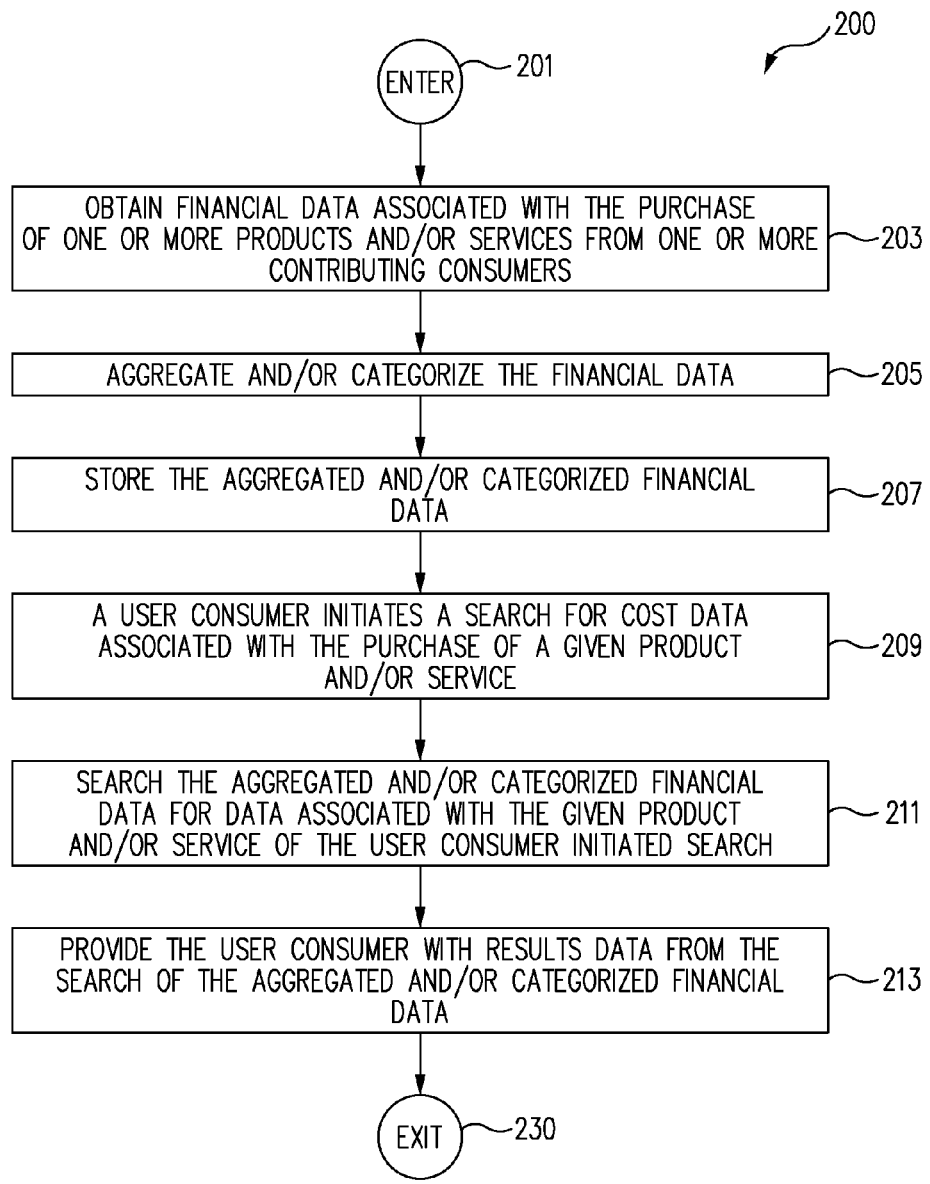
FIG. 2 is a flow chart depicting a process for estimating the actual cost of a product and/or service in accordance with one embodiment.

FIG. 2 is a flow chart depicting a process for estimating the actual cost of a product and/or service 200 in accordance with one embodiment. Process for estimating the actual cost of a product and/or service 200 begins at ENTER OPERATION 201 of FIG. 2 and process flow proceeds to OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203.

In one embodiment, at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 financial data associated with one or more "contributing consumers" is obtained from one or more sources.

In one embodiment, at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 the contributing consumers agree to share the financial data with other "user consumers" by any one of various means, including, as discussed below, tagging specific financial data as sharable data.

As also discussed below, in one embodiment, the financial data includes data associated with specific financial transactions and, in one embodiment; the specific financial transactions are tagged as sharable by the contributing consumers. In one embodiment, the specific financial transactions are categorized by the contributing consumers and/or associated with a specific purchase of a parent product and/or service.

In one embodiment, at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203, the financial data obtained from one or more contributing consumers is general financial data representing a given contributing consumer's general and/or overall financial status and/or demographics, including, but not limited to: the contributing consumer's total assets; the contributing consumer's total liabilities/debt; the contributing consumer's net worth; the contributing consumer's average discretionary spending; the contributing consumer's age group; various demographic data regarding the contributing consumer and/or the contributing consumer's spending; and/or any other data regarding the contributing consumer's general and/or overall financial status desired and/or available.

In one embodiment, as discussed below, the contributing consumer's general and/or overall financial status and/or demographics data is used to categorize and/or identify contributing consumers according to various criteria so a user consumer can narrow search results to results from specific "types" of contributing consumers.

In one embodiment, at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 the financial data associated with one or more contributing consumers represents various financial transactions conducted by a given contributing consumer. In one embodiment, at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 the financial data representing various financial transactions conducted by the contributing consumer includes, but is not limited to, data representing: dates of specific financial transactions; payees/payers associated with specific financial transactions; categories of specific financial transactions; total expenditures in specific financial transaction categories over designated time frames; specific items purchased through specific financial transactions; the geographic location of specific financial transactions; the geographic location where one or more services and/or products associated with specific financial transactions are used/delivered; and/or any other data regarding specific financial transactions desired and/or available.

In one embodiment, at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 the financial data associated with one or more contributing consumers is obtained by process for estimating the actual cost of a product and/or service 200 using, and/or through, and/or from, a computing system implemented financial management system.

In one embodiment, the financial data associated with one or more contributing consumers obtained at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 includes data associated with financial transactions conducted using multiple payment methods and/or accounts to provide as complete a set of contributing consumer financial data as possible. For instance, in one embodiment, the financial data associated with one or more contributing consumers is obtained at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 from, but not limited to, any one or more of the following sources: banks; debit cards and/or accounts; credit unions; credit cards and/or accounts and/or credit card/account providers; asset accounts and/or asset account providers; a user controlled computing system implemented financial management system; or other financial resources, accounts and/or services used by a contributing consumer to pay for and/or conduct financial transactions.

In addition, in some embodiments, the financial data associated with one or more contributing consumers obtained at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 is obtained from multiple sources of the same type. For instance, in one embodiment, the financial data associated with one or more contributing consumers is obtained at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 from: two or more banks; two or more debit cards and/or accounts; two or more credit unions; two or more credit cards and/or accounts and/or credit card/account providers; two or more asset accounts and/or asset account providers; two or more user controlled computing system implemented financial management systems; and/or two or more other financial resources, accounts and/or services used by a contributing consumer to pay for and/or conduct financial transactions.

As noted above, in one embodiment, all, or part, of the financial data associated with one or more contributing consumers is obtained by process for estimating the actual cost of a product and/or service 200 at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 from, or using, a computing system implemented financial management system, such as computing system implemented financial management system 180 (FIG. 1), that implements, includes, is accessed by, and/or is otherwise associated with process for estimating the actual cost of a product and/or service 200 (FIG. 2).

Currently, various computing system implemented financial management systems are available including: computing system implemented personal financial management systems; computing system implemented small business financial management systems; computing system implemented home inventory systems; computing system implemented tax preparation systems; computing system implemented business accounting systems; and computing system implemented medical expense management systems; as well as various other electronic transaction data driven financial/data management systems.

Computing system implemented financial management systems typically help users/contributing consumers manage their finances by providing a centralized interface with banks, credit card companies, and other various financial institutions and/or accounts, for identifying, processing, storing, and categorizing user/contributing consumer financial transactions and other contributing consumer financial data. Currently, computing system implemented financial management systems typically obtain financial transaction information, such as payee identification, payee location, payment amount, date of the transaction, time of transaction, items purchased, the type of transaction, etc., via communication with banks, credit card providers, or other financial institutions, using electronic data transfer systems such as the Open Financial Exchange (OFX) specification or various other systems for transferring financial transaction data.

As noted above, using computing system implemented financial management systems, the financial transaction information, payee identification, payee location, payment amount, date of the transaction, and other data is often used by the computing system implemented financial management system to categorize individual financial transactions as a particular type of income or expense. Some currently offered computing system implemented financial management systems then use this financial transaction information to track events, such as purchase events, and to provide various historical data reports or displays including "to date" data reports such as historical spending data reports in one or more particular categories, associated with one or more particular products and/or services, and/or with one or more particular payees, and/or one or more specific events.

In one embodiment, the financial data associated with one or more contributing consumers obtained using one or more computing system implemented financial management systems is transferred, or otherwise made available to, process for estimating the actual cost of a product and/or service 200 at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203.

In one embodiment, all, or part, of the financial data associated with one or more contributing consumers is obtained by process for estimating the actual cost of a product and/or service 200 at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 from invoices/bills and/or receipt data provided to process for estimating the actual cost of a product and/or service 200, and/or an associated computing system implemented financial management system, by one or more merchants and/or product and/or service providers. In one embodiment, the invoice/bill and/or receipt data includes "level 3" data indicating, among other things, the line item entry and product and/or service identification for each item purchased in the transaction.

As noted above, in one embodiment, process for estimating the actual cost of a product and/or service 200 is associated with a computing system implemented financial management system, such as computing system implemented financial management system 180 of FIG. 1, that implements, includes, is accessed by, and/or is otherwise associated with process for estimating the actual cost of a product and/or service 200 (FIG. 2). Some of these computing system implemented financial management systems provide the capability to obtain, receive, and/or process electronic copies of the invoices/receipts from one or more merchants and/or product and/or service providers, often in their specific formats, and then process and/or store the data for use by process for estimating the actual cost of a product and/or service 200 in one of numerous locations by one of numerous methods known to those of skill in the art and/or as discussed herein.

In one embodiment, all, or part, of the financial data associated with one or more contributing consumers is obtained by process for estimating the actual cost of a product and/or service 200, and/or a computing system implemented financial management system, at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 from one or more of the following, either directly, or by using screen scraping technology, or a similar technology: websites sponsored by, controlled by, or associated with banks, debit cards and/or accounts, credit unions, credit cards and/or accounts, and/or credit card/account providers, asset accounts and/or asset account providers, or other financial resources, accounts and/or services used by a contributing consumer to pay for and/or conduct financial transactions; and/or computing system implemented applications sponsored by, controlled by, or associated with banks, debit cards and/or accounts, credit unions, credit cards and/or accounts, and/or credit card/account providers, asset accounts and/or asset account providers, or other financial resources, accounts and/or services used by a contributing consumer to pay for and/or conduct financial transactions.

In one embodiment, all, or part, of the financial data associated with one or more contributing consumers is obtained by process for estimating the actual cost of a product and/or service 200 at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 from contributing consumer input through a user interface device such as keyboard 107, 157, mouse 111, 161 of FIG. 1 or a touchpad, voice recognition system, or any other device capable of providing user input to a computing system and/or for translating user actions into computing system operations, whether available or known at the time of filing or as developed later.

Returning to FIG. 2, in one embodiment, all, or part, of the financial data associated with one or more contributing consumers is obtained by process for estimating the actual cost of a product and/or service 200 at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 from any combination of the above sources and/or from any other source of financial data associated with one or more contributing consumers whether known at the time of filing or as developed thereafter.

In one embodiment, at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 the contributing consumers agree to share all or part of their financial data with process for estimating the actual cost of a product and/or service 200 and "user consumers" by any one of various means, including, tagging specific financial data as sharable data.

In one embodiment, at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 the contributing consumers agree to share the financial data with user consumers on a transaction-by-transaction approval basis. In one embodiment, at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203, the contributing consumers agree to share the financial data with user consumers on a transaction category approval basis. In one embodiment, at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 the contributing consumers agree to share the financial data with user consumers without restriction. In other embodiments, at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 the contributing consumers agree to share the financial data with user consumers based on any restrictions/criteria dictated by the contributing consumer.

In one embodiment, at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203, the financial data to be shared is tagged as sharable by the contributing consumers using a user interface display and a user interface device, such as those defined herein, known in the art, or developed after the time of filing.

In one embodiment, at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203, specific financial transaction data is assigned a category/name and/or a description by the contributing consumer and one or more specific financial transactions are associated by the contributing consumer with a specific parent event, such as a specific vacation. In one embodiment, at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203, specific financial transaction data is assigned a category/name and/or a description by the contributing consumer and one or more given financial transactions are associated by the contributing consumer with a specific purchase of a parent product and/or service, such as an HDTV purchase.

In one embodiment, at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203, specific financial transaction data is assigned a category/name and/or a description by the contributing consumer and a given financial transaction category, including one or more specific financial transactions is associated by the contributing consumer with a specific event, such as a specific vacation. In one embodiment, at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203, specific financial transaction data is assigned a category/name and/or a description by the contributing consumer, a given financial transaction category, including one or more specific financial transactions is associated by the contributing consumer with a specific purchase of a product and/or service, such as an HDTV purchase.

In one embodiment, at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203, all financial transactions in a given time period are associated by the contributing consumer with a specific parent event, such as a specific vacation. In one embodiment, at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203, all financial transactions in a given time period are associated by the contributing consumer with a specific purchase of a parent product and/or service, such as an HDTV purchase.

In one embodiment, at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203, all financial transactions having a given payee are associated by the contributing consumer with a specific parent event, such as a specific vacation. In one embodiment, at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203, all financial transactions having given payee are associated by the contributing consumer with a specific purchase of a parent product and/or service, such as an HDTV purchase.

As noted above, in one embodiment, at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203, specific financial transaction data is assigned a category/name and/or a description by the contributing consumer and a specific financial transaction is associated by the contributing consumer with a specific parent event, such as a specific vacation using a user interface and a user interface device. FIG. 3 shows a specific example of a contributing consumer interface display 300 for tagging a given financial transaction as sharable, and associating a given financial transaction with the purchase of a parent product and/or service, as would be displayed on a display device of a computing system, in one specific example, in accordance with one embodiment.

In one embodiment, contributing consumer interface display 300 would typically be associated, visually or otherwise, with a specific transaction item/record (not shown) displayed in a financial transaction ledger (not shown). In one embodiment, the specific transaction item/record (not shown) is displayed in a financial transaction ledger (not shown) as part of a computing system implemented financial management system, such as computing system implemented financial management system 180 of FIG. 1.

Returning to FIG. 3, in this specific example, contributing consumer interface display 300 includes: Name field 301, where, in this specific example, a contributing consumer identifies the category for the parent product and/or service associated with the financial transaction (not shown); Description field 303, where, in this specific example, a contributing consumer describes the parent product and/or service associated with the financial transaction (not shown); and "share this spending into with others" field where a contributing consumer can designate, i.e., flag/tag, the financial transaction (not shown) as sharable financial data by, in this specific example, placing a check mark in box 307.

In this specific example, contributing consumer interface display 300 shows that: in Name field 301, the financial transaction (not shown) is designated with the category "Mexico Trip" by the contributing consumer; in Description field 303, the contributing consumer has designated the product and/or service associated with the financial transaction (not shown) as "Mexico Fall 2007", i.e., a vacation to Mexico; and the consumer has checked box 307 indicating at "share this spending into with others" field that the financial transaction is sharable. Consequently, in this specific example, the financial transaction data (not shown) and the data from consumer interface display 300 is provided to process for estimating the actual cost of a product and/or service 200 (FIG. 2).

In one embodiment, a consumer interface display, such as consumer interface display 300, is generated for each, or multiple, financial transaction records (not shown) so that multiple financial transaction records can be associated with a single product and/or service purchase category or description as identified at Name field 301 and/or Description field 303.

Returning to FIG. 3, contributing consumer interface display 300 is shown and discussed for illustrative purposes only. Those of skill in the art will readily recognize that the data displayed and the format of the data displayed are exemplary only and that numerous other choices for the data displayed and the format of the data displayed are possible. Consequently, the specific illustrative example of FIG. 3 and contributing consumer interface display 300 should not be read as limiting the scope of the claims presented below.

In one embodiment, once the financial data associated with one or more contributing consumers is obtained at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203, process flow proceeds to AGGREGATE AND/OR CATEGORIZE THE FINANCIAL DATA OPERATION 205.

In one embodiment, at AGGREGATE AND/OR CATEGORIZE THE FINANCIAL DATA OPERATION 205 the financial data obtained from one or more contributing consumers at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 is aggregated, processed, and/or categorized, according to the parent product and/or service purchased associated with the financial data.

In one embodiment, at AGGREGATE AND/OR CATEGORIZE THE FINANCIAL DATA OPERATION 205 the financial data obtained from one or more contributing consumers at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203, is aggregated according to the parent product and/or service purchased and/or associated with the financial data, and/or the categorizations provided by the contributing consumers and/or another source such as a computing system implemented financial management system.

In one embodiment, at AGGREGATE AND/OR CATEGORIZE THE FINANCIAL DATA OPERATION 205 the financial data obtained from one or more contributing consumers at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 is aggregated according to the parent product and/or service purchased and/or associated with the financial data, and/or categorizations and/or re-categorizations, and/or groupings, determined by process for estimating the actual cost of a product and/or service 200 and/or the providers of process for estimating the actual cost of a product and/or service 200.

In one embodiment, at AGGREGATE AND/OR CATEGORIZE THE FINANCIAL DATA OPERATION 205 the financial data obtained from one or more contributing consumers at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 is aggregated according to any criteria desired using any one the numerous methods for processing and aggregating data.

Methods, means, processes, procedures and mechanisms for analyzing, aggregating, and categorizing data according to various parameters/criteria as well known in the art. Consequently, a more detailed discussion of any specific methods, means, processes, procedures and mechanisms for analyzing, aggregating, and categorizing data, such as, in one embodiment, is performed at AGGREGATE AND/OR CATEGORIZE THE FINANCIAL DATA OPERATION 205, is omitted here to avoid detracting from the invention.

In one embodiment, once the financial data obtained from one or more contributing consumers at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 is aggregated, processed, and/or categorized, according to the parent product and/or service purchased and/or associated with the financial data at AGGREGATE AND/OR CATEGORIZE THE FINANCIAL DATA OPERATION 205, process flow proceeds to STORE THE AGGREGATED AND/OR CATEGORIZED FINANCIAL DATA OPERATION 207.

In one embodiment, at STORE THE AGGREGATED AND/OR CATEGORIZED FINANCIAL DATA OPERATION 207, the aggregated and/or categorized contributing consumer financial data of AGGREGATE AND/OR CATEGORIZE THE FINANCIAL DATA OPERATION 205 is stored by, or under the control of, process for estimating the actual cost of a product and/or service 200.

In one embodiment, at STORE THE AGGREGATED AND/OR CATEGORIZED FINANCIAL DATA OPERATION 207, the aggregated and/or categorized contributing consumer financial data is stored in whole, or in part, in a database maintained by, accessible by, owned by, or otherwise related to: process for estimating the actual cost of a product and/or service 200, and/or a provider of process for estimating the actual cost of a product and/or service 200; a computing system implemented financial management system, and/or a provider of a computing system implemented financial management system; or any other party, by any one of the numerous mechanisms known to those of skill in the art. For instance, in one embodiment, the data, in whole, or in part, is stored in a memory system, such as memory systems 103 and 153 or server memory system 123, or database 170, of FIG. 1, or in a cache memory, such as cache memories 103A/153A of FIG. 1, or in any main memory or mass memory, associated with a computing system, such as computing systems 100 or 150 described above. In one embodiment, the data, in whole, or in part, is stored in any computing system and/or server system, such as computing systems 100 or 150 or server system 120, or other device, in another location, or on/in a computer readable medium, and/or any other computer program product, as defined herein. In one embodiment, the data, in whole, or in part, is stored on a webpage, in a web-based system or on a public network such as the Internet.

Returning to FIG. 2, in some embodiments, the aggregated and/or categorized contributing consumer financial data stored as described above is maintained, in whole, or in part, by: process for estimating the actual cost of a product and/or service 200, and/or a provider of process for estimating the actual cost of a product and/or service 200; a computing system implemented financial management system, and/or a provider of a computing system implemented financial management system; a third party data storage institution; any third party service or institution; or any other parties. In one embodiment, access to the aggregated and/or categorized contributing consumer financial data is then provided to process for estimating the actual cost of a product and/or service 200, and/or a computing system implemented financial management system, by providing access to the data and/or providing the data on a computer program product.

In one embodiment, once the aggregated and/or categorized contributing consumer financial data of AGGREGATE AND/OR CATEGORIZE THE FINANCIAL DATA OPERATION 205 is stored by, or under the control of, process for estimating the actual cost of a product and/or service 200 at STORE THE AGGREGATED AND/OR CATEGORIZED FINANCIAL DATA OPERATION 207, process flow proceeds to A USER CONSUMER INITIATES A SEARCH FOR COST DATA ASSOCIATED WITH THE PURCHASE OF A GIVEN PRODUCT AND/OR. SERVICE OPERATION 209.

In one embodiment, at A USER CONSUMER INITIATES A SEARCH FOR COST DATA ASSOCIATED WITH THE PURCHASE OF A GIVEN PRODUCT AND/OR SERVICE OPERATION 209 a "user consumer" initiates a request for financial data associated with the purchase of a specified product and/or service.

In one embodiment, at A USER CONSUMER INITIATES A SEARCH FOR COST DATA ASSOCIATED WITH THE PURCHASE OF A GIVEN PRODUCT AND/OR SERVICE OPERATION 209 the user consumer initiates a request for financial data associated with the purchase of a specified product and/or service using a user interface display and a user interface device, such as defined herein, known in the art, and/or as developed after the time of filing. In one embodiment, at A USER CONSUMER INITIATES A SEARCH FOR COST DATA ASSOCIATED WITH THE PURCHASE OF A GIVEN PRODUCT AND/OR SERVICE OPERATION 209 the user consumer initiates a request for financial data associated with the purchase of a specified product and/or service using a computing system, such as defined herein, known in the art, and/or as developed after the time of filing. In one embodiment, at A USER CONSUMER INITIATES A SEARCH FOR COST DATA ASSOCIATED WITH THE PURCHASE OF A GIVEN PRODUCT AND/OR SERVICE OPERATION 209 the user consumer initiates a request for financial data associated with the purchase of a specified product and/or service over a network such as defined herein, known in the art, and/or as developed after the time of filing.

In one embodiment, as part of the user consumer initiated request for cost data associated with the purchase of a specified product and/or service, the user consumer provides the name and/or category of a specific parent product and/or service for which the user consumer desires purchase cost data. The specific parent product and/or service can be identified using various data including, but not limited to: a general product and/or service common name, such as Mexico Vacation or HDTV; a specific product and/or service common name, such as "Resort Best" in Baja California or a Sony HDTV; a product part and/or model number; or any other means for identifying a product and/or service, known in the art, and/or as developed after the time of filing.

In one embodiment, as part of the user consumer initiated request for cost data associated with the purchase of a specified product and/or service, the user consumer provides other search parameters and/or criteria, such as a request to see all results from specific categories of contributing consumers, or from contributing consumers having specific financial and/or demographic attributes.

Recall that, in one embodiment, at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203, the contributing consumer's general and/or overall financial status and/or demographics data is obtained. In one embodiment, at AGGREGATE AND/OR CATEGORIZE THE FINANCIAL DATA OPERATION 205, the contributing consumer's general and/or overall financial status and/or demographics data is used to categorize and/or identify contributing consumers, and/or their financial data contributed, according to various criteria. In one embodiment, at A USER CONSUMER INITIATES A SEARCH FOR COST DATA ASSOCIATED WITH THE PURCHASE OF A GIVEN PRODUCT AND/OR SERVICE OPERATION 209 a user consumer can then narrow search results to results from specific "types" of contributing consumers with the specific types of contributing consumers being identified based on the contributing consumer's general and/or overall financial status and/or demographics data of OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203 and the contributing consumer categorizations of AGGREGATE AND/OR CATEGORIZE THE FINANCIAL DATA OPERATION 205.

Figure 4:
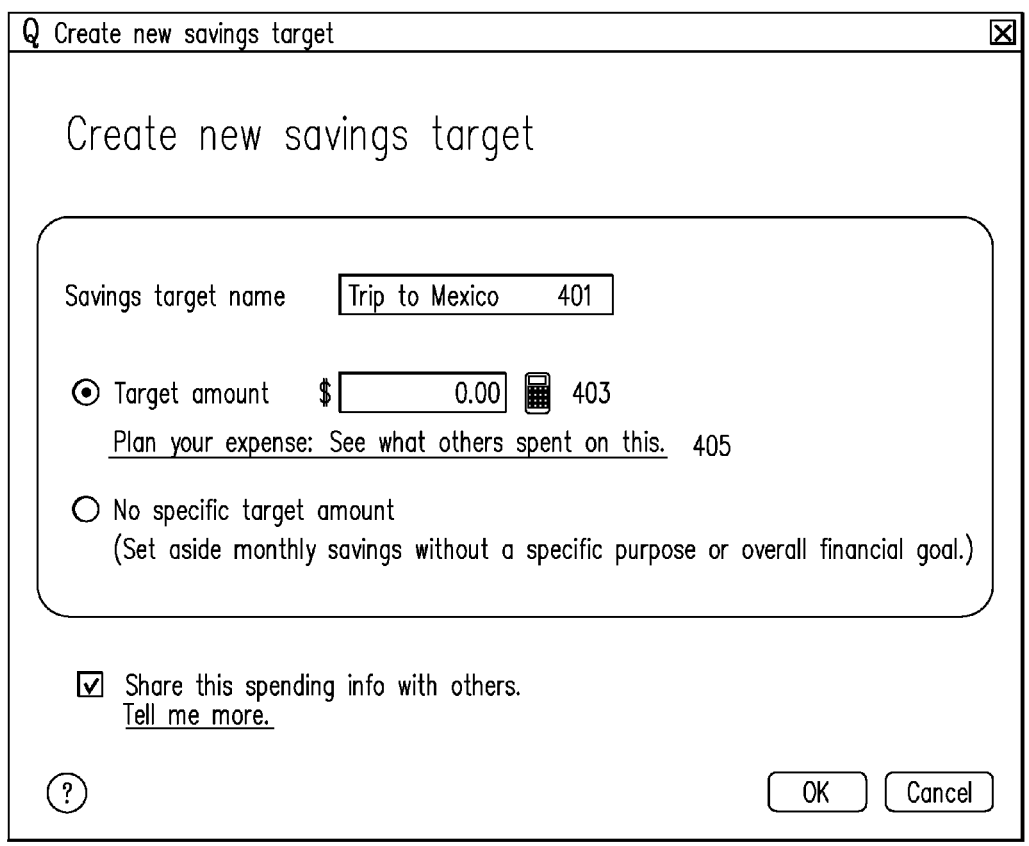
FIG. 4 is a user consumer interface display for creating a savings plan and initiating a search for cost data as would be displayed on a display device in one specific example in accordance with one embodiment.

As noted above, in one embodiment, at A USER CONSUMER INITIATES A SEARCH FOR COST DATA ASSOCIATED WITH THE PURCHASE OF A GIVEN PRODUCT AND/OR SERVICE OPERATION 209 a user consumer initiates a request for financial data associated with the purchase of a specified product and/or service using a user interface display and a user interface device. FIG. 4 shows a specific example of a user consumer interface display 400 for creating a savings plan and initiating a search for cost data as would be displayed on a display device in one specific example, in accordance with one embodiment.

In one embodiment, user consumer interface display 400 would typically be displayed as part of a computing system implemented financial management system, such as computing system implemented financial management system 180 of FIG. 1, and would be used as part of a budgeting feature to help a user consumer plan/budget his of her expenses and, in this specific case, save for a trip to Mexico.

Returning to FIG. 4, in this specific example, user consumer interface display 400 includes: Savings target name field 401, where, in this specific example, a user consumer identifies the category and/or name for the parent product and/or service associated with proposed saving plan; Target amount field 403, where, in this specific example, a contributing consumer designates/estimates the cost of the parent product and/or service, which as discussed herein, absent process for estimating the actual cost of a product and/or service 200 (FIG. 2), is often difficult to estimate at best; and "Plan your expense: See what others spent on this" field/link 405 where, using process for estimating the actual cost of a product and/or service 200, a user consumer can opt to find and view financial data, such as the financial data of STORE THE AGGREGATED AND/OR CATEGORIZED FINANCIAL DATA OPERATION 207 (FIG. 2), associated with the parent product and/or service identified in Savings target name field 401, as discussed below.

In this specific example, user consumer interface display 400 shows that in Savings target name field 401, the product and/or service identified is a trip to Mexico. In this specific example, user consumer interface display 400 shows that Target amount field 403 is currently blank because the user consumer realizes he or she does not have enough information to make a realistic assessment of the cost of the trip yet; and the user consumer has selected "Plan your expense: See what others spent on this" field/link 405 in order to obtain the necessary data to make a realistic assessment of the cost of the trip at Target amount field 403 using process for estimating the actual cost of a product and/or service 200 (FIG. 2). The result of the user consumer selecting "Plan your expense: See what others spent on this" field/link 405 is discussed below with respect to FIG. 5.

Returning to FIG. 4, user consumer interface display 400 is shown and discussed for illustrative purposes only. Those of skill in the art will readily recognize that the data displayed and the format of the data displayed are exemplary only and that numerous other choices for the data displayed and the format of the data displayed are possible. Consequently, the specific illustrative example of FIG. 4 and, user consumer interface display 400, should not be read as limiting the scope of the claims presented below.

In one embodiment, once a user consumer initiates a request for financial data associated with the purchase of a specified product and/or service at A USER CONSUMER INITIATES A SEARCH FOR COST DATA ASSOCIATED WITH THE PURCHASE OF A GIVEN PRODUCT AND/OR SERVICE OPERATION 209, process flow proceeds to SEARCH THE AGGREGATED AND/OR CATEGORIZED FINANCIAL DATA FOR DATA ASSOCIATED WITH THE GIVEN PRODUCT AND/OR SERVICE OF THE USER CONSUMER INITIATED SEARCH OPERATION 211.

In one embodiment, at SEARCH THE AGGREGATED AND/OR CATEGORIZED FINANCIAL DATA FOR DATA ASSOCIATED WITH THE GIVEN PRODUCT AND/OR SERVICE OF THE USER CONSUMER INITIATED SEARCH OPERATION 211 the aggregated and/or categorized contributing consumer financial data stored at STORE THE AGGREGATED AND/OR CATEGORIZED FINANCIAL DATA OPERATION 207 is searched and results data associated with the purchase of the user consumer specified product and/or service of A USER CONSUMER INITIATES A SEARCH FOR COST DATA ASSOCIATED WITH THE PURCHASE OF A GIVEN PRODUCT AND/OR SERVICE OPERATION 209 is obtained.

In one embodiment, at SEARCH THE AGGREGATED AND/OR CATEGORIZED FINANCIAL DATA FOR DATA ASSOCIATED WITH THE GIVEN PRODUCT AND/OR SERVICE OF THE USER CONSUMER INITIATED SEARCH OPERATION 211 the aggregated and/or categorized contributing consumer financial data is searched and search results data associated with the purchase of the user consumer specified product and/or service, and/or most closely matching any user consumer search parameters and/or criteria of A USER CONSUMER INITIATES A SEARCH FOR COST DATA ASSOCIATED WITH THE PURCHASE OF A GIVEN PRODUCT AND/OR SERVICE OPERATION 209, is obtained using any search method and/or search engine known in the art at the time of filing or as developed after the time of filing.

In one embodiment, the search results data associated with the purchase of the user consumer specified product and/or service includes data indicating various secondary, or child, purchases made in association with the purchase of a parent product and/or service and the cost of these secondary purchases.

Numerous, methods, means, mechanisms, processes and/or procedures for analyzing and/or searching data in response to various search criteria/parameters, are well known to those of skill in the art. Consequently, a more detailed discussion of methods, means, mechanisms, processes and/or procedures for analyzing and/or searching data in response to various search criteria/parameters, such as the analysis/search performed, in one embodiment, at SEARCH THE AGGREGATED AND/OR CATEGORIZED FINANCIAL DATA FOR DATA ASSOCIATED WITH THE GIVEN PRODUCT AND/OR SERVICE OF THE USER CONSUMER INITIATED SEARCH OPERATION 211, is omitted here to avoid detracting from the invention.

In one embodiment, once the aggregated and/or categorized contributing consumer financial data stored at STORE THE AGGREGATED AND/OR CATEGORIZED FINANCIAL DATA OPERATION 207 is searched and results data associated with the purchase of the user consumer specified product and/or service of A USER CONSUMER INITIATES A SEARCH FOR COST DATA ASSOCIATED WITH THE PURCHASE OF A GIVEN PRODUCT AND/OR SERVICE OPERATION 209 is obtained at SEARCH THE AGGREGATED AND/OR CATEGORIZED FINANCIAL DATA FOR DATA ASSOCIATED WITH THE GIVEN PRODUCT AND/OR SERVICE OF THE USER CONSUMER INITIATED SEARCH OPERATION 211, process flow proceeds to PROVIDE THE USER CONSUMER WITH RESULTS DATA FROM THE SEARCH OF THE AGGREGATED AND/OR CATEGORIZED FINANCIAL DATA OPERATION 213.

In one embodiment, at PROVIDE THE USER CONSUMER WITH RESULTS DATA FROM THE SEARCH OF THE AGGREGATED AND/OR CATEGORIZED FINAN- CIAL DATA OPERATION 213, the results data obtained at SEARCH THE AGGREGATED AND/OR CATEGORIZED FINANCIAL DATA FOR DATA ASSOCIATED WITH THE GIVEN PRODUCT AND/OR SERVICE OF THE USER CONSUMER INITIATED SEARCH OPERATION 211 is presented to the user consumer in any one of various data and/or report formats.

In one embodiment, at PROVIDE THE USER CONSUMER WITH RESULTS DATA FROM THE SEARCH OF THE AGGREGATED AND/OR CATEGORIZED FINANCIAL DATA OPERATION 213 the search results data associated with the purchase of the user consumer specified product and/or service, and/or most closely matching any user consumer search parameters and/or criteria, is presented to the user consumer in any one of various data and/or report formats showing the actual cost associated with the purchase or the specific parent product and/or service, and/or a listing of other products and/or services associated with the specific product and/or service that contributing consumers have also purchased.

FIG. 5 shows a specific example of a search results display 500 as would be displayed on a display device in one specific example, in accordance with one embodiment, at PROVIDE THE USER CONSUMER WITH RESULTS DATA FROM THE SEARCH OF THE AGGREGATED AND/OR CATEGORIZED FINANCIAL DATA OPERATION 213 in response to "Plan your expense: See what others spent on this" field/link 405 being selected by the user consumer in user consumer interface display 400 (FIG. 4) at A USER CONSUMER INITIATES A SEARCH FOR COST DATA ASSOCIATED WITH THE PURCHASE OF A GIVEN PRODUCT AND/OR SERVICE OPERATION 209 (FIG. 2).

Returning to FIG. 5, in this specific example, search results display 500 includes: Heading field 501 indicating that, in this specific example, the search conducted at SEARCH THE AGGREGATED AND/OR CATEGORIZED FINANCIAL DATA FOR DATA ASSOCIATED WITH THE GIVEN PRODUCT AND/OR SERVICE OF THE USER CONSUMER INITIATED SEARCH OPERATION 211 was based on "Mexico" as the search parameter; "Show me" selection field 503, indicating that, in this specific example, the user consumer has opted to view average values as opposed to high or low values; and associated activities/cost listing 505 showing in this example, various supplementary activities associated with a Mexico trip and their average cost.

Using search results display 500, in this specific example, the user consumer can now select what supplementary activities he or she is interested in, and then obtain the average cost of those activities based on the aggregated and/or categorized contributing consumer financial data stored at STORE THE AGGREGATED AND/OR CATEGORIZED FINANCIAL DATA OPERATION 207 from one or more contributing consumers. Consequently, the user consumer can now more accurately determine the actual total cost of his or her Mexico vacation and more accurately determine the amount to put in Target amount field 403 of user consumer interface display 400 (FIG. 4). Therefore, using process for estimating the actual cost of a product and/or service 200 (FIG. 2) the user consumer is more likely to budget and save for his or her trip correctly.

As noted, the specific example discussed above is hypothetical and presented for illustrative purposes only. Consequently, the specific example discussed above is not meant to limit the scope of the claims presented below in any way. In addition, search results display 500 is shown and discussed for illustrative purposes only. Those of skill in the art will readily recognize that the data displayed and the format of the data displayed are exemplary only and that numerous other choices for the data displayed and the format of the data displayed are possible. Consequently, the specific illustrative example of FIG. 5, and search results display 500, should not be read as limiting the scope of the claims presented below.

In one embodiment, at PROVIDE THE USER CONSUMER WITH RESULTS DATA FROM THE SEARCH OF THE AGGREGATED AND/OR CATEGORIZED FINANCIAL DATA OPERATION 213 the results data obtained at SEARCH THE AGGREGATED AND/OR CATEGORIZED FINANCIAL DATA FOR DATA ASSOCIATED WITH THE GIVEN PRODUCT AND/OR SERVICE OF THE USER CONSUMER INITIATED SEARCH OPERATION 211 is presented to the user consumer in any one of various data and/or report formats using any of the means for data and/or information transfer discussed herein, known in the art, and/or as developed after the time of filing.

In one embodiment, once the results data obtained at SEARCH THE AGGREGATED AND/OR CATEGORIZED FINANCIAL DATA FOR DATA ASSOCIATED WITH THE GIVEN PRODUCT AND/OR SERVICE OF THE USER CONSUMER INITIATED SEARCH OPERATION 211 is presented to the user consumer in any one of various data and/or report formats at PROVIDE THE USER CONSUMER WITH RESULTS DATA FROM THE SEARCH OF THE AGGREGATED AND/OR CATEGORIZED FINANCIAL DATA OPERATION 213, process flow proceeds to EXIT OPERATION 230. In one embodiment, at EXIT OPERATION 230, process for estimating the actual cost of a product and/or service 200 is exited to await new data.

Using process for estimating the actual cost of a product and/or service 200, a potential consumer of a given product and/or service is provided the opportunity to see the financial data associated with other consumer's purchases of the given product and/or service and, in particular, what other purchases/costs were associated with the purchase of the given product and/or service. Consequently, process for estimating the actual cost of a product and/or service 200, a potential consumer of a given product and/or service can learn from the experience of other consumers of the given product and/or service and thereby more readily determine the actual cost associated with the purchase of a given product and/or service. Therefore, process for estimating the actual cost of a product and/or service 200, the potential consumer is far less likely to be faced with unexpected costs associated with a given purchase.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "accessing", "analyzing", "obtaining", "determining", "collecting", "creating", "transferring", "storing", "searching", "comparing", "providing", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored via a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s are identified using a particular nomenclature for ease of description and understanding, but other nomenclature is often used in the art to identify equivalent operations.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Therefore, numerous variations, whether explicitly provided for by the specification or implied by the specification or not, may be implemented by one of skill in the art in view of this disclosure.

What is claimed is:

1. A system for estimating actual cost of a product comprising:
   one or more processors; and
   one or more memories coupled to the one or more processors, the one or more memories having stored therein instructions which when executed by the one or more processors perform a process comprising:
   obtaining financial data associated with a purchase of two or more products, the financial data being from two or more different contributing consumers, the one or more products comprising one or more parent products and one or more nonparent products, the obtained financial data including general and demographics data of the one or more contributing consumers;
   categorizing, by each respective contributing consumer using one or more tags, the financial data associated with the purchase of one or more nonparent products, the categorization indicating that the categorized one or more nonparent products are directly related to one or more of the parent products, wherein the result of the categorization includes one or more financial transactions designated as being a purchase of one or more parent products, and one or more transactions involving nonparent products being designated as being related to particular ones of the transactions involving the purchase of one or more parent products, resulting in categorized data;
   aggregating the categorized data according to the parent product purchase with which the financial data is associated;
   storing the categorized and aggregated financial data;
   in response to a user consumer initiated search for cost data associated with a given parent product purchase, the user consumer initiated search including general or demographics search information, searching the categorized and aggregated financial data associated with the purchase of the given parent product and for which the respective contributing consumers meet the general or demographics search information; and providing the user consumer the categorized and aggregated financial data from one or more contributing consumers associated with the purchase of the given parent product who meet the general or demographics search information, the provided information comprising a list of the given parent product and one or more related nonparent products, together with total and individual actual costs associated with the purchase of the given parent product and the one or more nonparent products associated with the parent product that contributing consumers have also purchased, wherein the financial data provides user-selectable averaged, high or low amounts for the nonparent products, according to actual cost data extracted from the aggregated financial data, and further wherein the user selects one or more nonparent products for inclusion in a total cost presentation.

2. The system for estimating actual cost of a product of claim 1, wherein;
obtaining financial data associated with the purchase of one or more products from one or more contributing consumers comprises obtaining financial data associated with the purchase of one or more products from one or more contributing consumers that has previously been designated by the one or more contributing consumers as sharable financial data on a category approval basis.

3. The system for estimating actual cost of a product of claim 1, wherein;
obtaining financial data associated with the purchase of one or more products from one or more contributing consumers comprises obtaining financial data associated with the purchase of one or more products from one or more contributing consumers from a computing system implemented financial management system.

4. The system for estimating actual cost of a product of claim 1, wherein;
obtaining financial data associated with the purchase of one or more products from one or more contributing consumers comprises obtaining financial data representing specific financial transactions.

5. The system for estimating actual cost of a product of claim 1, wherein;
categorizing the financial data associated with the purchase of the one or more products from the one or more contributing consumers according to a parent product purchase with which the financial data is associated is performed using a computing system implemented financial management system.

6. The system for estimating actual cost of a product of claim 1, wherein;
obtaining financial data associated with the purchase of one or more products from one or more contributing consumers comprises obtaining financial data representing specific financial transactions, further wherein;
categorizing the financial data associated with the purchase of the one or more products from the one or more contributing consumers according to a parent product purchase with which the financial data is associated comprises categorizing financial data representing two or more specific financial transactions associated with the purchase of two or more products from a single contributing consumer as being associated with a single parent product purchase.

7. The system for estimating actual cost of a product of claim 1, wherein;
obtaining financial data associated with the purchase of one or more products from one or more contributing consumers comprises obtaining financial data representing specific financial transactions, further wherein;
categorizing the financial data associated with the purchase of the one or more products from the one or more contributing consumers according to a parent product purchase with which the financial data is associated comprises categorizing financial data representing all specific financial transactions associated with the purchase of the one or more products during a specific time period, from a single contributing consumer, as being associated with a single parent product purchase.

8. The system for estimating actual cost of a product of claim 1, wherein;
obtaining financial data associated with the purchase of one or more products from one or more contributing consumers comprises obtaining financial data representing specific financial transactions, further wherein;
categorizing the financial data associated with the purchase of the one or more products from the one or more contributing consumers according to a parent product purchase with which the financial data is associated comprises categorizing financial data representing all specific financial transactions associated with the purchase of the one or more products from a specific payee, from a single contributing consumer, as being associated with a single parent product purchase.

9. The system for estimating actual cost of a product of claim 1, wherein;
aggregating the financial data associated with the purchase of the one or more products from the one or more contributing consumers according to the parent product purchase with which the financial data is associated comprises aggregating the financial data associated with the purchase of the two or more products from at least one of the one or more contributing consumers according to a single parent product purchase with which the financial data is associated.

10. The system for estimating actual cost of a product of claim 1, wherein;
providing the user consumer at least part of the categorized and aggregated financial data from one or more contributing consumers associated with the purchase of the given parent product comprises providing the user consumer aggregated financial data from one or more contributing consumers comprising financial data associated with the purchase of two or more products from the one or more contributing consumers associated with the purchase of the given parent product.

11. The system for estimating actual cost of a product of claim 1, wherein;
providing the user consumer at least part of the categorized and aggregated financial data from one or more contributing consumers associated with the purchase of the given parent product comprises providing the user consumer aggregated financial data from one or more contributing consumers comprising cost data associated with the purchase of two or more products from the one or more contributing consumers associated with the purchase of the given parent product.

12. The system for estimating actual cost of a product of claim 1, wherein;
providing the user consumer at least part of the categorized and aggregated financial data from one or more contributing consumers associated with the purchase of the given parent product comprises providing the user consumer aggregated financial data from one or more contributing consumers comprising average cost data associated with the purchase of two or more products from the one or more contributing consumers associated with the purchase of the given parent product.

13. A computer program product for providing a process for estimating actual cost of a product comprising:
a nontransitory computer readable medium;
and computer program code, encoded on the computer readable medium, comprising computer readable instructions for:
obtaining financial data associated with a purchase of two or more products, the financial data being from two or more different contributing consumers, the one or more products comprising one or more parent products and one or more nonparent products, the obtained financial data including general and demographics data of the one or more contributing consumers;
categorizing, by each respective contributing consumer using one or more tags, the financial data associated with the purchase of one or more nonparent products, the categorization indicating that the categorized one or more nonparent products are directly related to one or more of the parent products, wherein the result of the categorization includes one or more financial transactions designated as being a purchase of one or more parent products, and one or more transactions involving nonparent products being designated as being related to particular ones of the transactions involving the purchase of one or more parent products, resulting in categorized data;
aggregating the categorized data according to the parent product purchase with which the financial data is associated;
storing the categorized and aggregated financial data;
in response to a user consumer initiated search for cost data associated with a given parent product purchase, the user consumer initiated search including general or demographics search information, searching the categorized and aggregated financial data associated with the purchase of the given parent product and for which the respective contributing consumers meet the general or demographics search information; and
providing the user consumer the categorized and aggregated financial data from one or more contributing consumers associated with the purchase of the given parent product who meet the general or demographics search information, the provided information comprising a list of the given parent product and one or more related nonparent products, together with total and individual actual costs associated with the purchase of the given parent product and the one or more nonparent products associated with the parent product that contributing consumers have also purchased, wherein the financial data provides user-selectable averaged, high or low amounts for the nonparent products, according to actual cost data extracted from the aggregated financial data, and further wherein the user selects one or more nonparent products for inclusion in a total cost presentation.

14. The computer program product for providing a process for estimating actual cost of a product of claim 13, wherein;
obtaining financial data associated with the purchase of one or more products from one or more contributing consumers comprises obtaining financial data associated with the purchase of one or more products from one or more contributing consumers that has previously been designated by the one or more contributing consumers as sharable financial data on a category approval basis.

15. The computer program product for providing a process for estimating actual cost of a product of claim 13, wherein;
obtaining financial data associated with the purchase of one or more products from one or more contributing consumers comprises obtaining financial data associated with the purchase of one or more products from one or more contributing consumers from a computing system implemented financial management system.

16. The computer program product for providing a process for estimating actual cost of a product of claim 13, wherein;
obtaining financial data associated with the purchase of one or more products from one or more contributing consumers comprises obtaining financial data representing specific financial transactions.

17. The computer program product for providing a process for estimating actual cost of a product of claim 13, wherein;
categorizing the financial data associated with the purchase of the one or more products from the one or more contributing consumers according to a parent product purchase with which the financial data is associated is performed using a computing system implemented financial management system.

18. The computer program product for providing a process for estimating actual cost of a product of claim 13, wherein;
obtaining financial data associated with the purchase of one or more products from one or more contributing consumers comprises obtaining financial data representing specific financial transactions, further wherein;
categorizing the financial data associated with the purchase of the one or more products from the one or more contributing consumers according to a parent product purchase with which the financial data is associated comprises categorizing financial data representing two or more specific financial transactions associated with the purchase of two or more products from a single contributing consumer as being associated with a single parent product purchase.

19. The computer program product for providing a process for estimating actual cost of a product of claim 13, wherein;
obtaining financial data associated with the purchase of one or more products from one or more contributing consumers comprises obtaining financial data representing specific financial transactions, further wherein;
categorizing the financial data associated with the purchase of the one or more products from the one or more contributing consumers according to a parent product purchase with which the financial data is associated comprises categorizing financial data representing all specific financial transactions associated with the purchase of the one or more products during a specific time period, from a single contributing consumer, as being associated with a single parent product purchase.

20. The computer program product for providing a process for estimating actual cost of a product of claim 13, wherein;
obtaining financial data associated with the purchase of one or more products from one or more contributing consumers comprises obtaining financial data representing specific financial transactions, further wherein;
categorizing the financial data associated with the purchase of the one or more products from the one or more contributing consumers according to a parent product purchase with which the financial data is associated comprises categorizing financial data representing all specific financial transactions associated with the purchase of the one or more products from a specific payee, from a single contributing consumer, as being associated with a single parent product purchase.

21. The computer program product for providing a process for estimating actual cost of a product of claim 13, wherein;
aggregating the financial data associated with the purchase of the one or more products from the one or more contributing consumers according to the parent product purchase with which the financial data is associated comprises aggregating the financial data associated with the purchase of the two or more products from at least one of the one or more contributing consumers according to a single parent product purchase with which the financial data is associated.

22. The computer program product for providing a process for estimating actual cost of a product of claim 13, wherein;
providing the user consumer at least part of the categorized and aggregated financial data from one or more contributing consumers associated with the purchase of the given parent product comprises providing the user consumer aggregated financial data from one or more contributing consumers comprising financial data associated with the purchase of two or more products from the one or more contributing consumers associated with the purchase of the given parent product.

23. The computer program product for providing a process for estimating actual cost of a product of claim 13, wherein;
providing the user consumer at least part of the categorized and aggregated financial data from one or more contributing consumers associated with the purchase of the given parent product comprises providing the user consumer aggregated financial data from one or more contributing consumers comprising cost data associated with the purchase of two or more products from the one or more contributing consumers associated with the purchase of the given parent product.

24. A system for estimating actual cost of a product comprising:
means for obtaining financial data associated with a purchase of two or more products, the financial data being from two or more different contributing consumers, the one or more products comprising one or more parent products and one or more nonparent products, the obtained financial data including general and demographics data of the one or more contributing consumers;
means for categorizing, by each respective contributing consumer using one or more tags, the financial data associated with the purchase of one or more nonparent products, the categorization indicating that the categorized one or more nonparent products are directly related to one or more of the parent products, wherein the result of the categorization includes one or more financial transactions designated as being a purchase of one or more parent products, and one or more transactions involving nonparent products being designated as being related to particular ones of the transactions involving the purchase of one or more parent products, resulting in categorized data;
means for aggregating the categorized data according to the parent product purchase with which the financial data is associated; means for storing the categorized and aggregated financial data;
means for, in response to a user consumer initiated search for cost data associated with a given parent product purchase, the user consumer initiated search including general or demographics search information, searching the categorized and aggregated financial data associated with the purchase of the given parent product and for which the respective contributing consumers meet the general or demographics search information; and
means for providing the user consumer the categorized and aggregated financial data from one or more contributing consumers associated with the purchase of the given parent product who meet the general or demographics search information, the provided information comprising a list of the given parent product and one or more related nonparent products, together with total and individual actual costs associated with the purchase of the given parent product and the one or more nonparent products associated with the parent product that contributing consumers have also purchased, wherein the financial data provides user-selectable averaged, high or low amounts for the nonparent products, according to actual cost data extracted from the aggregated financial data, and further wherein the user selects one or more nonparent products for inclusion in a total cost presentation.

25. The system for estimating actual cost of a product of claim 24, wherein;
the means for obtaining financial data associated with the purchase of one or more products from one or more contributing consumers comprises a computing system implemented financial management system.

26. The system for estimating actual cost of a product of claim 24, wherein;
the means for obtaining financial data associated with the purchase of one or more products from one or more contributing consumers obtains financial data representing specific financial transactions.

27. The system for estimating actual cost of a product of claim 24, wherein;
the means for categorizing the financial data associated with the purchase of the one or more products from the one or more contributing consumers according to a parent product purchase with which the financial data is associated comprises a computing system implemented financial management system.

28. The system for estimating actual cost of a product of claim 24, wherein;
the means for obtaining financial data associated with the purchase of one or more products from one or more contributing consumers obtains financial data representing specific financial transactions, further wherein;
the means for categorizing the financial data associated with the purchase of the one or more products from the one or more contributing consumers according to a parent product purchase with which the financial data is associated categorizes financial data representing two or more specific financial transactions associated with the purchase of two or more products from a single contributing consumer as being associated with a single parent product purchase.

29. The system for estimating actual cost of a product of claim 24, wherein;
the means for obtaining financial data associated with the purchase of one or more products from one or more contributing consumers obtains financial data representing specific financial transactions, further wherein;
the means for categorizing the financial data associated with the purchase of the one or more products from the one or more contributing consumers according to a parent product purchase with which the financial data is associated categorizes financial data representing all specific financial transactions associated with the purchase of the one or more products during a specific time period, from a single contributing consumer, as being associated with a single parent product purchase.

30. The system for estimating actual cost of a product of claim 24, wherein;
the means for obtaining financial data associated with the purchase of one or more products from one or more contributing consumers obtains financial data representing specific financial transactions, further wherein;
the means for categorizing the financial data associated with the purchase of the one or more products from the one or more contributing consumers according to a parent product purchase with which the financial data is associated categorizes financial data representing all specific financial transactions associated with the purchase of the one or more products from a specific payee, from a single contributing consumer, as being associated with a single parent product purchase.

31. The system for estimating actual cost of a product of claim 24, wherein;
the means for aggregating the financial data associated with the purchase of the one or more products from the one or more contributing consumers according to the parent product purchase with which the financial data is associated aggregates the financial data associated with the purchase of the two or more products from at least one of the one or more contributing consumers according to a single parent product purchase with which the financial data is associated.

32. The system for estimating actual cost of a product of claim 24, wherein;
the means for providing the user consumer at least part of the categorized and aggregated financial data from one or more contributing consumers associated with the purchase of the given parent product provides the user consumer aggregated financial data from one or more contributing consumers comprising financial data associated with the purchase of two or more products from the one or more contributing consumers associated with the purchase of the given parent product.

33. The system for estimating actual cost of a product of claim 24, wherein;
the means for providing the user consumer at least part of the categorized and aggregated financial data from one or more contributing consumers associated with the purchase of the given parent product provides the user consumer aggregated financial data from one or more contributing consumers comprising cost data associated with the purchase of two or more products from the one or more contributing consumers associated with the purchase of the given parent product.

\* \* \* \* \*